March 24, 1953 — C. CRISTOFV — 2,632,661
JOINT FOR SURGICAL INSTRUMENTS
Filed Aug. 14, 1948
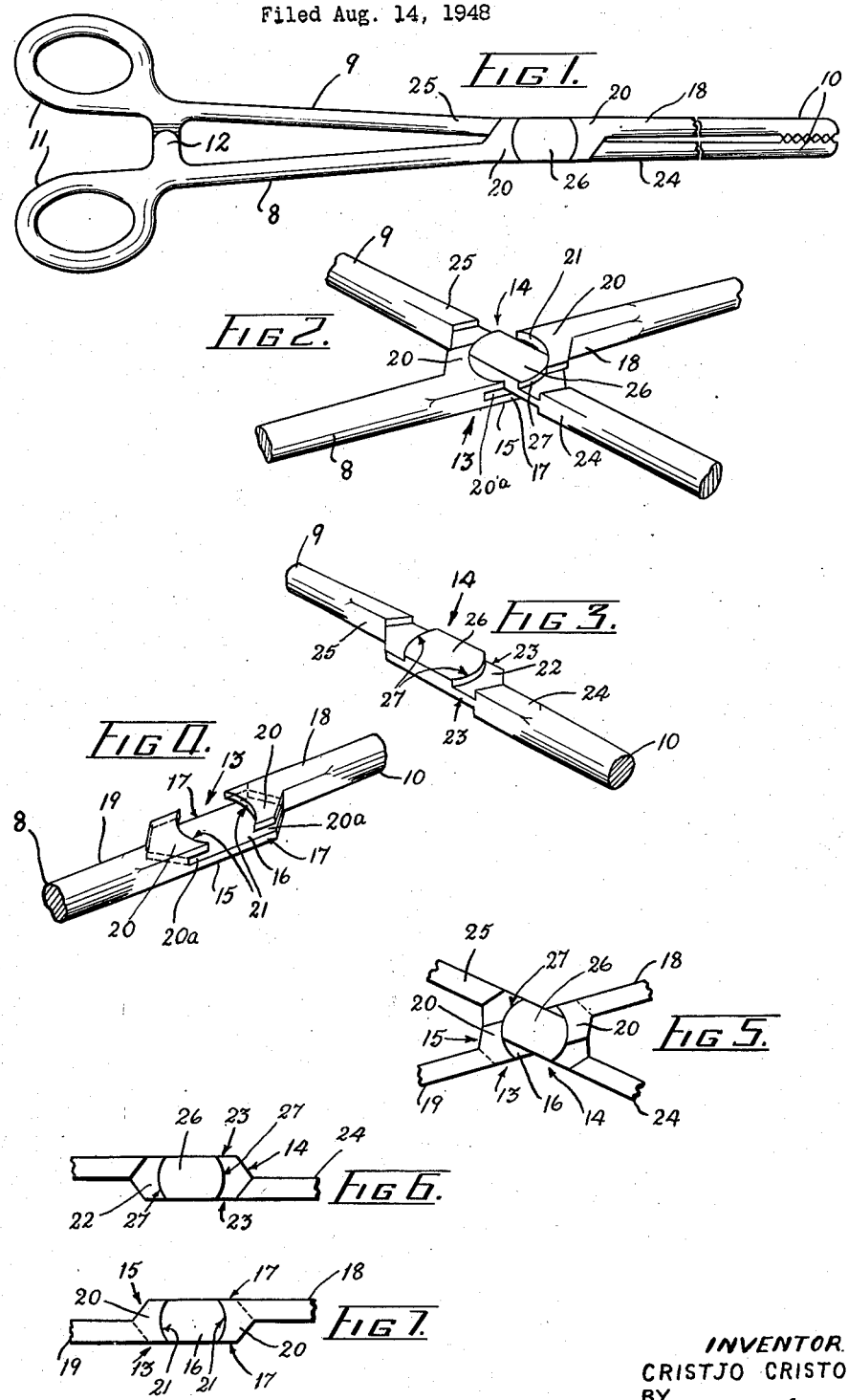
INVENTOR.
CRISTJO CRISTOFV
BY Frederick C. Bromley
ATT'Y Patented Mar. 24, 1953

2,632,661

UNITED STATES PATENT OFFICE 2,632,661

JOINT FOR SURGICAL INSTRUMENTS

Cristjo Cristofv, Toronto, Ontario, Canada

Application August 14, 1948, Serial No. 44,315

3 Claims. (Cl. 287—101)

My invention relates primarily to surgical instruments of the kind which comprise two relatively swingable members pivotally connected and provided with jaws or other co-operating parts on one end and opposing handles on the other end by means of which the jaws or other co-operating parts may be moved toward or away from each other, such for instance as forceps of various kinds.

The general object of the present invention is to provide an improved joint for the two relatively swingable members of the instrument. More particularly it is the aim of my invention to provide a joint which is admirably suited for instruments of the surgical class which have to be properly cleaned and thoroughly sterilized, as is well understood in the art. For this purpose it is most desirable to employ a joint which will enable the two members of the instrument to be readily taken apart in order that they may be properly cleaned and sterilized while separated to assure that the task is thoroughly carried out and to facilitate its being done with the utmost satisfaction.

According to instruments of the prior art it has already been proposed to provide a separable joint by which the two relatively swingable members are interlocked in a manner such that they can be separated when swung to substantially right angles. The interlocking connection dispenses with a pin or rivet at the pivot point of union. The two swingable members are devised to be assembled by bringing them together at an angle similar to that at which they were separated.

My invention essentially concerns a joint of the character referred to above, in which the shank portions of the two members are not joined by a third member in the nature of a pin or rivet, but are solely united by an interlocking connection.

According to my improved structure the shank of one of the swingable members is provided with integral means to act as a pivotal pin, and the shank of the other swingable member is devised to form a pivotal bearing for said means.

My improved joint provides a pivotal connection which is comparatively cheap and easy to manufacture. It facilitates the handling of the instrument and presents a structure which is easy to clean and to sterilize. Moreover it provides a sturdy joint.

In the accompanying drawing,

Fig. 1 is a side elevation of a surgical instrument in which the two swingable members are connected together by a joint of the present invention.

Fig. 2 is a perspective view of the joint in which the swingable members are in spread disposition.

Fig. 3 is a perspective view of the male element of the joint.

Fig. 4 is a similar view of the female element of the joint.

Fig. 5 is a plan view of the joint.

Fig. 6 is a plan view of the female element of the joint, and

Fig. 7 is a similar view of the male element of the joint.

Referring to the drawing by reference numerals, the two members of the instrument are designated 8 and 9, which members are pivotally connected at the point of intersection. Conventional jaws 10 or other co-operating parts are provided at one end of said members and opposing handles 11 are provided on the other end thereof. At the handled ends of said members there may be an ordinary latching device 12 for securing the jaws in a closed position. Such a latching is common to forceps and does not form a part of the present invention.

The pivotal joint of the instant disclosure comprises a female element 13 integral with the shank portion of the member 8, and a male element 14 integral with the shank portion of the member 9.

The female element comprises an elongated plate section 15 having a flat inner face 16 and parallel side edges 17. The jaw section 18 of said shank and the handle section 19 thereof are of less width than said plate section and extend from the ends thereof in relative offset disposition having regard to the side edges 17 of the plate section. A lip 20 extends inwardly of each end of said plate section to overlie the inner face 16 thereof. Said lips are formed by thickened end portions of said plate section in which are provided recesses 20ᵃ that extend inwardly of the confronting end faces 21 of said lips. Said end faces 21 are concaved on an arc of a circle whose diameter is substantially larger than the width of said plate section 15 in order to form a gap between the lips of a dimension slightly in excess of the width of said plate section 15.

The male element 14 comprises an elongated plate section 22 of a thickness to fit in said recesses 20ᵃ with a working fit. This plate section is of the same width as the plate section 15 and has parallel side edges 23. The jaw section 24 of the shank and the handle section 25 thereof are of less width than said plate section 22 and extend from the ends thereof in relative offset disposition having regard to said side edges 23. A boss 26 is fashioned on one side of the plate section 22 for engaging in the gap between said lips 20. The boss is of a truncated circular configuration having opposite rounded edge faces 27 conforming to the arcuate end faces 21 of said lips for engagement therewith. The truncated side edges of the boss are flush with said side edges 23.

It will be manifest from the preceding description that the invention provides a very sturdy joint for the members 8 and 9, and one which is easy to assemble and to take apart for cleansing and sterilizing the instrument. Assembly is effected by placing the members 8 and 9 at substantially right angles and engaging the male element of the joint in the female element thereof with the boss 26 between the lips 20, and then relatively turning said members so that the curved ends 27 of the boss will engage the arcuate end faces 21 of the lips with an attendant engagement of the end portions of the plate section 22 in the recesses 20ª. Obviously an opening movement of the members 8 and 9 to a right angular disposition enables them to be separated.

A further important feature of the invention is that it provides a joint structure by which two relatively movable members of an instrument may be permanently connected for pivotal movement. To effect such a permanent connection it is only necessary to make the lips of a width greater than the gap between them. In this event it is necessary in the manufacture of the instrument to bend either of the lips upwardly to permit assembly of the two relatively movable members and when assembled to bend the lip down to proper position. Should it become necessary to separate the two relatively movable members this can be achieved by reducing the width of the lips by a grinding operation.

What I claim is:

1. A joint for surgical instruments and the like comprising a female member consisting of an elongated flat plate-like section having laterally presented side faces and flat parallel top and bottom faces, and elongated arm extending from each end of the plate-like section, said arms each being substantially smaller in width and substantially thicker than the plate-like section, said arms both being flush along their bottom faces with the bottom face of said plate-like section and being upwardly offset from the top face thereof, one of said arms being proximate to one of said side faces and the other of said arms being proximate to the other of said side faces so that the arms are axially offset with respect to each other, said plate-like section further being provided across each of its ends, in the region of its juncture with said arms, with a flat lip disposed in outwardly spaced parallel overlying relation to the top face of said plate-like section, said lips extending inwardly toward each other and having opposed concave transverse margins conforming to circular arcs having a common center, and a male member adapted for removable co-operation with the female member, said male member consisting of an elongated plate substantially similar in size and shape to the plate-like section of the female member and having laterally presented side faces and flat parallel top and bottom faces, the bottom face being adapted, when the joint is operatively assembled, to rotate bearingwise upon the top face of the plate-like section of the female member, said plate further being integrally provided upon its top face with an upstanding boss having transverse convex margins conforming to circular arcs having a common center which is aligned with the center of the concave transverse lip-margins when the joint is operatively assembled so that said convex margins will rotate bearingwise against the concave margins of the lips forming a part of the female member.

2. A joint for surgical instruments and the like comprising a female member consisting of an elongated flat plate-like section having laterally presented side faces and flat parallel top and bottom faces, an elongated arm extending from each end of the plate-like section, said arms each being substantially smaller in width and substantially thicker than the plate-like section, said arms both being flush along their bottom faces with the bottom face of said plate-like section and being upwardly offset from the top face thereof, one of said arms being proximate to one of said side faces and the other of said arms being proximate to the other of said side faces so that the arms are axially offset with respect to each other, said plate-like section further being provided across each of its ends, in the region of its juncture with said arms, with a flat lip disposed in outwardly spaced parallel overlying relation to the top face of said plate-like section, said lips extending inwardly toward each other and having opposed concave transverse margins conforming to circular arcs having a common center and being spaced from each other to form a gap larger than the transverse width of the plate-like section; and a male member adapted for removable co-operation with the female member, said male member consisting of an elongated plate having laterally presented side faces and flat parallel top and bottom faces and being substantially similar in size and shape to the plate-like section of the female member so as to fit within the gap of the female member when presented at right angles with respect to the longitudinal axis thereof, the bottom face being adapted, when the joint is operatively assembled, to rotate bearingwise upon the top face of the plate-like section of the female member, said plate further being integrally provided upon its top face with an upstanding boss having transverse convex margins conforming to circular arcs having a common center which is aligned with the center of the concave margins of the lips when the joint is operatively assembled so that said convex margins will rotate bearingwise against the concave margins of the lips forming a part of the female member.

3. A joint for surgical instruments and the like comprising a female member consisting of an elongated flat plate-like section having laterally presented side faces and flat parallel top and bottom faces, an elongated arm extending from each end of the plate-like section, said arms each being substantially smaller in width and substantially thicker than the plate-like section, said arms both being flush along their bottom faces with the bottom face of said plate-like section and being upwardly offset from the top face thereof, one of said arms being proximate to one of said side faces and the other of said arms being proximate to the other of said side faces so that the arms are axially offset with respect to each other, said plate-like section further being provided across each of its ends, in the region of its juncture with said arms, with a flat lip disposed in outwardly spaced parallel overlying relation to the top face of said plate-like section, said lips extending inwardly toward each other and having opposed concave transverse margins conforming to circular arcs having a common center, and a male member adapted for removable co-operation with the female member, said male member consisting of an elongated plate substantially similar in size and shape to the plate-like section of the female member and having laterally presented side faces and flat parallel top and bottom faces, the bottom face being adapted, when the joint is operatively assembled, to rotate bearingwise upon the top face of the plate-like section of the female member, said plate further being integrally provided upon its top face with an upstanding boss having transverse convex margins conforming to circular arcs having a common center which is aligned with the center of the concave margins of the lips when the joint is operatively assembled so that said convex margins will rotate bearingwise against the concave margins of the lips forming a part of the female member, said plate of the male member further being provided across each of its ends with oppositively extending arms of corresponding size and shape to the arms of the female member and likewise being axially offset with respect to each other toward the respective side faces of the plate and extending equidistantly upwardly and downwardly from the top and bottom faces, respectively, of the plate so that when the joint is assembled and swung into closed position the corresponding arms of the male and female members will lie respectively alongside each other.

CRISTJO CRISTOFV.

REFERENCES CITED

The following references are of record in the file of this patent:

UNITED STATES PATENTS

| Number | Name | Date |
|---|---|---|
| 534,732 | Titcomb | Feb. 26, 1895 |
| 594,043 | Thompson et al. | Nov. 23, 1897 |
| 796,543 | Viser | Aug. 8, 1905 |